Feb. 17, 1925.  
W. H. SCHRADER  
POULTRY FOUNTAIN  
Filed Aug. 25, 1924  
1,526,682

Inventor,  
William H. Schrader,  
By Frank S Appleman  
Attorney.

Patented Feb. 17, 1925.

1,526,682

UNITED STATES PATENT OFFICE.

WILLIAM H. SCHRADER, OF NOBLESVILLE, INDIANA.

POULTRY FOUNTAIN.

Application filed August 25, 1924. Serial No. 734,098.

*To all whom it may concern:*

Be it known that I, WILLIAM H. SCHRADER, a citizen of the United States of America, and resident of Noblesville, in the county of Hamilton and State of Indiana, have invented certain new and useful Improvements in Poultry Fountains, of which the following is a specification.

This invention relates to feeding fountains, and particularly to a device intended for use as a reservoir and trough for dispensing food, either in a solid or liquid form to fowls or the like.

It is an object of this invention primarily to produce a poultry watering and feeding fountain in which the pan or trough is loose from the reservoir and its support, a condition which will permit the removal of the pan for the purpose of cleaning it.

It is a further object of this invention to produce a fountain or container or reservoir which can be filled and inverted over the pan or trough without spilling any of the contents of the fountain.

It is a still further object of this invention to produce a support for the reservoir or fountain which will adjustably retain the same with respect to the bottom of the pan to increase or diminish the amount of water or feed in the pan, as will be understood when it is stated that the discharge opening or mouth of the reservoir is sealed by the contents of the pan and that when the material in the pan recedes below the mouth of the reservoir, a further feeding action or discharge from the reservoir occurs.

It has been found in practice that a device embodying this invention, by reason of the adjustable means for holding the fountain, is of utility in distributing or dispensing water, milk, buttermilk, clabber, dry mash, medicine or any food or drink for poultry, since the discharging action of the reservoir will be regulated in the manner stated.

With the foregoing and other objects in view, the invention consists in the details of construction, and in the arrangement and combination of parts to be hereinafter more fully set forth and claimed.

In describing the invention in detail, reference will be had to the accompanying drawing forming part of this application wherein like characters denote corresponding parts in the several views, and in which—

Figure 1:
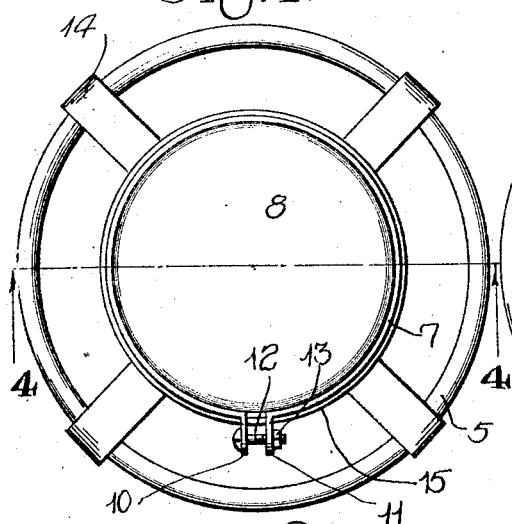
Figure 1 illustrates a top plan view of a poultry feeding device embodying the invention.
Figure 3:
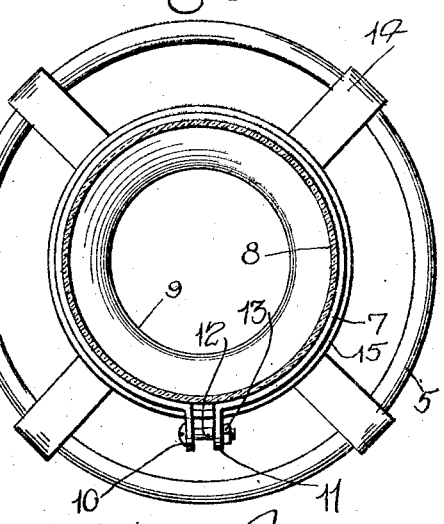
Figure 3 illustrates a sectional view on the line 3—3 of Fig. 2.
Figure 2:
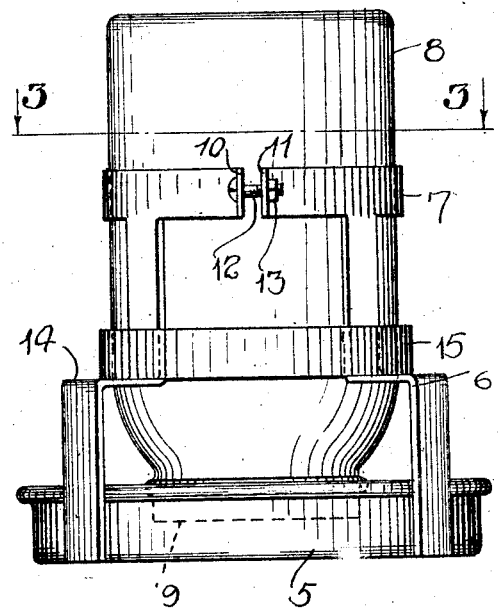
Figure 2 illustrates a view in side elevation thereof.
Figure 4:
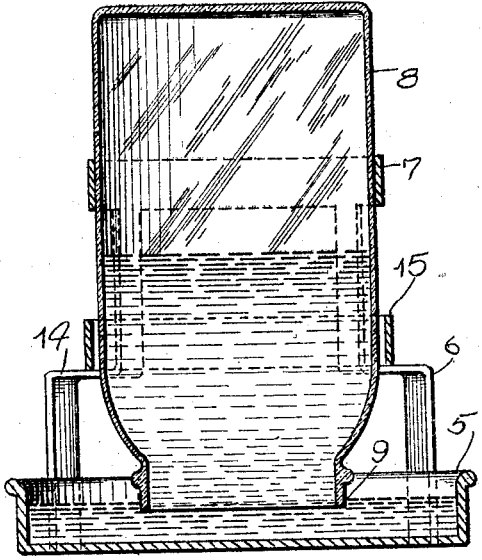
Figure 4 illustrates a sectional view on the line 4—4 of Fig. 1.

In these drawings, 5 denotes the pan or trough, the same to be hereinafter referred to as a "pan," which may be of any appropriate material that may be kept in sanitary condition by cleaning, and the said pan is embraced by legs 6 which extend from and are preferably formed integral with a clip ring 7 which is intended to be drawn into engagement with the outer wall of the reservoir 8, here illustrated as a jar-like holder provided with an open mouth 9, which is held supported in a plane below the upper edge of the pan.

The clip ring, in the present embodiment of the invention, has two apertured ears 10 and 11, through which a bolt 12 extends and the nut 13 on the bolt is relied upon for holding the clip ring in engagement with the reservoir in different positions of adjustment of the said reservoir according to the condition of the material to be fed, which may depend upon the relation of the mouth of the reservoir to the bottom of the pan, and the said reservoir may be held at different heights by the action of the clamping ring.

The legs 6 are shown as having inwardly bent portions 14 above the pan, and a ring 15 encircles the legs above the offset portions and rests on the said offset portions, the said ring being effective to prevent spreading or distortion of the legs.

It will be understood that the pan and the other parts associated with the said device may be of different sizes to suit particular requirements, but for the purpose of feeding young chicks the pan should be relatively shallow in order that the smaller chicks could get in and out of the pan without liability of their being drowned, but these are details of construction which those skilled in the art will understand and carry into effect for the successful commercialization of the device.

I claim:

1. In a poultry fountain, a reservoir support comprising a clamping ring having supporting legs, the said legs having offset portions near their lower ends terminating in downwardly extending portions adapted to rest on the ground, a pan within the area of the lower ends of the legs, a reservoir fitting in the clamping ring and having its sides braced by those portions of the legs above the offset portions thereof, the said reservoir being suspended with its mouth below the upper edge of the pan.

2. In a poultry fountain, a reservoir support comprising a clamping ring having supporting legs, a pan within the area of the lower ends of the supporting legs, a reservoir clamped by the ring with its mouth located below the upper edge of the pan, the said legs having offset portions above the pan, and a ring embracing the legs and lying on the offset portions of the said legs, substantially as described.

WILLIAM H. SCHRADER.